United States Patent
Mathews et al.

(10) Patent No.: US 10,367,575 B1
(45) Date of Patent: Jul. 30, 2019

(54) HIGH POINTING ACCURACY SPACECRAFT

(71) Applicant: Space Systems/Loral, LLC, Palo Alto, CA (US)

(72) Inventors: Deborah Mathews, Saratoga, CA (US); Michael Aliamus, San Jose, CA (US); Gordon Wu, Sunnyvale, CA (US); Ty Davis Lee, San Francisco, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 126 days.

(21) Appl. No.: 15/709,341

(22) Filed: Sep. 19, 2017

(51) Int. Cl.
| *H01Q 19/18* | (2006.01) |
| --- | --- |
| *H04B 7/185* | (2006.01) |
| *H04B 7/06* | (2006.01) |
| *H01Q 3/08* | (2006.01) |
| *H01Q 1/28* | (2006.01) |
| *H01Q 21/00* | (2006.01) |
| *H01Q 1/52* | (2006.01) |
| *H01Q 25/02* | (2006.01) |
| *H01Q 1/10* | (2006.01) |

(Continued)

(52) U.S. Cl.
CPC .......... *H04B 7/18515* (2013.01); *H01Q 3/08* (2013.01); *H01Q 19/18* (2013.01); *H04B 7/0617* (2013.01); *H01Q 1/10* (2013.01); *H01Q 1/288* (2013.01); *H01Q 1/525* (2013.01); *H01Q 3/12* (2013.01); *H01Q 15/161* (2013.01); *H01Q 21/00* (2013.01); *H01Q 25/02* (2013.01)

(58) Field of Classification Search
CPC ........ H01Q 1/288; H01Q 3/12; H01Q 15/161; H01Q 21/00; H01Q 1/525; H01Q 1/10; H01Q 25/02; H01Q 3/08
See application file for complete search history.

(56) References Cited

U.S. PATENT DOCUMENTS

| 5,940,034 A | * | 8/1999 | Leung .................... H04B 1/126 342/359 |
| --- | --- | --- | --- |
| 6,570,535 B1 | | 5/2003 | Stevens et al. |

(Continued)

OTHER PUBLICATIONS

Harris, "Unfurlable Mesh Reflector Antennas," [retrieved from Internet at https://www.harris.com/solution/unfurlable-mesh-reflector-antennas], Jul. 17, 2017, 5 pages.

*Primary Examiner* — Mewale A Ambaye
(74) *Attorney, Agent, or Firm* — Weaver Austin Villeneuve & Sampson LLP (57) ABSTRACT

A spacecraft payload subsystem includes a tracking receiver, an input multiplexer, an antenna pointing mechanism (APM) controller and a plurality of antenna reflectors. Each antenna reflector is mechanically coupled with a respective APM, and illuminated by a respective tracking feed element. Each respective tracking feed element is configured to receive an uplink beacon signal from the ground by way of one of the antenna reflectors and is coupled, by way of a respective pseudo-monopulse (PSM) coupler and the input multiplexer, to the tracking receiver. The tracking receiver is configured to receive multiplexed signals from the PSM couplers by way of the input multiplexer and output corresponding pointing error information to the APM controller. The APM controller is configured to send commands to one or more of the APMs. Each APM is configured to point a respective antenna reflector in response to the commands.

16 Claims, 4 Drawing Sheets

(51) Int. Cl.
*H01Q 3/12* (2006.01)
*H01Q 15/16* (2006.01)

(56) References Cited

U.S. PATENT DOCUMENTS

| | | | |
|---|---|---|---|
| 8,179,313 B1* | 5/2012 | Azziz | H01Q 3/12 342/354 |
| 2007/0146227 A1* | 6/2007 | Brooks | B64G 1/222 343/881 |
| 2011/0181479 A1 | 7/2011 | Martin et al. | |
| 2014/0266955 A1 | 9/2014 | Yi et al. | |
| 2015/0123843 A1 | 5/2015 | Lier et al. | |
| 2016/0118715 A1 | 4/2016 | Adams et al. | |

\* cited by examiner

HIGH POINTING ACCURACY SPACECRAFT

TECHNICAL FIELD

The present disclosure relates generally to a spacecraft, and more particularly to spacecraft with improved antenna pointing accuracy.

BACKGROUND OF THE INVENTION

The assignee of the present invention manufactures and deploys spacecraft for, inter alia, communications and broadcast services. Market demands for such spacecraft have imposed increasingly stringent requirements on spacecraft payloads in response to which large unfurlable reflectors and narrow RF beams are desirable. In such spacecraft, antenna pointing errors less than 0.03° are desirable.

RF autotracking (RFAT) is a technique for reducing antenna pointing errors by steering antenna reflectors mounted to a spacecraft platform to compensate for payload pointing disturbances. U.S. Pat. No. 5,940,034, entitled "Dual RF Autotrack Control", U.S. Pat. No. 6,570,535, entitled "Single-Receiver Multiple-Antenna RF Autotrack Control", and U.S. Pat. No. 8,179,313, entitled "Antenna Tracking Profile Estimation" assigned to the assignee of the present invention and incorporated by reference into the present disclosure in their entireties, relate to RFAT techniques.

In the absence of the presently disclosed techniques, nominal pointing accuracy for a large unfurlable reflector may be within about 0.035° in the absence of transients induced by thruster firing (for stationkeeping purposes, for example) and within about 0.065° during thruster induced transients.

SUMMARY

The systems, methods and devices of this disclosure each have several innovative aspects, no single one of which is solely responsible for the desirable attributes disclosed herein.

According to some implementations, a spacecraft includes a payload subsystem, the payload subsystem including: a tracking receiver; an input multiplexer; an antenna pointing mechanism (APM) controller; and a plurality of antenna reflectors, each antenna reflector mechanically coupled with a respective APM, and illuminated by a respective tracking feed element, each respective tracking feed element being configured to receive an uplink beacon signal from the ground by way of one of the antenna reflectors and being coupled, by way of a respective pseudo-monopulse (PSM) coupler and the input multiplexer, to the tracking receiver. The tracking receiver is configured to receive multiplexed signals from the PSM couplers by way of the input multiplexer and output corresponding pointing error information to the APM controller. The APM controller is configured to send commands to one or more of the APMs. Each APM is configured to point a respective antenna reflector in response to the commands.

In some examples, each respective tracking feed element may be configured to receive a different respective uplink beacon signal.

In some examples, each PSM coupler may be disposed proximate to a respective tracking feed element. In some examples, each PSM coupler may be communicatively coupled with a respective tracking feed element by a waveguide having a run length less than ten feet.

In some examples, the input multiplexer may be disposed between tracking receiver and the PSM couplers.

In some examples, each PSM coupler may be coupled with a respective tracking feed element by separate signal paths for each of $\Delta Az(i)$, $\Delta El(i)$ and $\Sigma$. In some examples, each separate signal path may include a respective waveguide, the respective waveguides being thermally coupled together to reduce temperature differences between respective waveguides.

In some examples, at least one antenna reflector may be an unfurlable reflector having a diameter, when unfurled, of at least five meters.

In some examples, the spacecraft may include electric thrusters and the spacecraft may be configured to avoid propulsive maneuver during operation of the payload subsystem except with the electric thrusters.

In some examples, the APM may have a step size less than 1.5 mdeg.

According to some implementations, an RF autotracking (RFAT) subsystem for a spacecraft includes a tracking receiver; an input multiplexer; an antenna pointing mechanism (APM) controller; and a plurality of antenna reflectors, each antenna reflector mechanically coupled with a respective APM, and illuminated by a respective tracking feed element, each respective tracking feed element being configured to receive an uplink beacon signal from the ground by way of one of the antenna reflectors and being coupled, by way of a respective pseudo-monopulse (PSM) coupler and the input multiplexer, to the tracking receiver. The tracking receiver is configured to receive multiplexed signals from the PSM couplers by way of the input multiplexer and output corresponding pointing error information to the APM controller. The APM controller is configured to send commands to one or more of the APMs. Each APM is configured to point a respective antenna reflector in response to the commands.

In some examples, each PSM coupler may be disposed proximate to a respective tracking feed element.

In some examples, the input multiplexer may be disposed between tracking receiver and the PSM couplers.

In some examples, each PSM coupler may be coupled with a respective tracking feed element by separate signal paths for each of $\Delta Az(i)$, $\Delta El(i)$ and $\Sigma$. In some examples, each separate signal path may include a respective waveguide, the respective waveguides being thermally coupled together to reduce temperature differences between respective waveguides.

According to some implementations a method includes receiving, with a tracking receiver of a spacecraft payload subsystem, by way of an input multiplexer, multiplexed signals from a plurality of pseudo-monopulse (PSM) couplers, each PSM coupler being disposed proximate to a respective tracking feed element and adjusting the pointing of a plurality of antenna reflectors, responsive to the received multiplexed signals. The spacecraft payload subsystem includes the tracking receiver, an input multiplexer, an antenna pointing mechanism (APM) controller, and the plurality of antenna reflectors. Each antenna reflector is mechanically coupled with a respective APM, and illuminated by a respective tracking feed element, each respective tracking feed element being configured to receive a respective uplink beacon signal from the ground by way of one of the antenna reflectors and being coupled by way of a respective one of the plurality of PSM couplers and the input multiplexer to the tracking receiver. The tracking receiver is configured to receive the multiplexed signals from the PSM couplers by way of the input multiplexer and output corresponding pointing error information to the APM controller. The APM controller is configured to send commands to one or more of the APMs. Each APM is configured to point a respective antenna reflector in response to the commands.

In some examples, each PSM coupler may be disposed proximate to a respective tracking feed element.

In some examples, the input multiplexer may be disposed between tracking receiver and the PSM couplers.

In some examples, each PSM coupler is coupled with a respective tracking feed element by separate signal paths for each of ΔAz(i), ΔEl(i) and Σ. In some examples, each separate signal path may include a respective waveguide, the respective waveguides being thermally coupled together to reduce temperature differences between respective waveguides.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Figure 1:
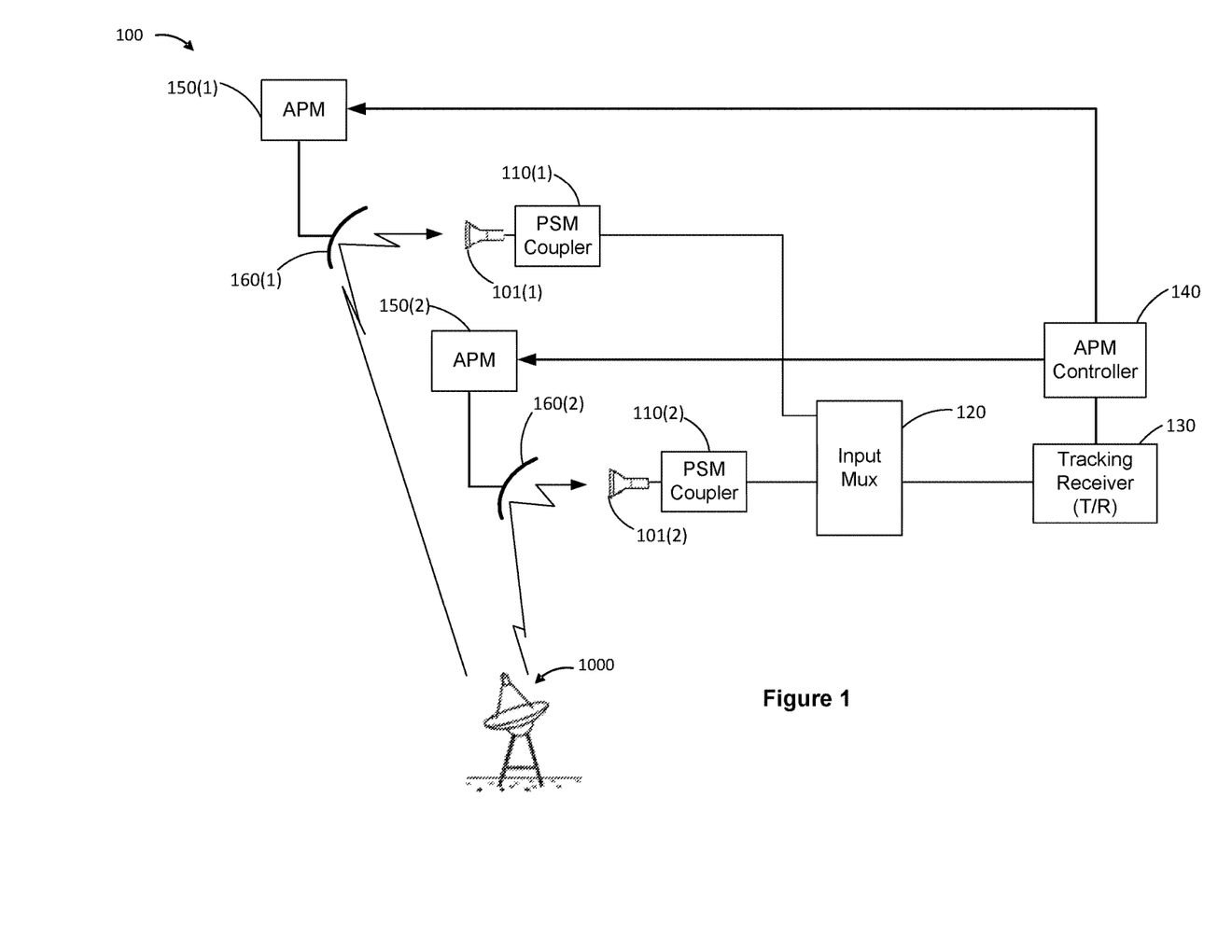
FIG. 1 illustrates a simplified block diagram of a closed loop, RF auto-tracked, mechanically actuated antenna pointing system for a spacecraft, according to an implementation.

FIG. 1 illustrates a simplified block diagram of a closed loop, RF auto-tracked, mechanically actuated antenna pointing system for a spacecraft. The system 100 includes a plurality of antenna reflectors 160 (in the illustrated example, antenna reflector 160(1) and antenna reflector 160(2). Each antenna reflector 160 is illuminated by associated tracking feed element 101 that may be included in or co-located with a beam forming network and/or a plurality of radiating feed elements (not illustrated). More particularly, antenna reflector 160(1) may be illuminated by tracking feed element 101(1) and antenna reflector 160(2) may be illuminated by tracking feed element 101(2).

Each tracking feed element 101(i) may receive, by way of a respective antenna reflector 160(i), an uplink beacon signal from a ground station 1000 and forward an azimuth error signal ΔAz(i), an elevation error signal ΔEl(i) and a sum signal Σ(i) to a respective PSM coupler 110(i). Outputs from the PSM coupler may be forwarded to an RF autotrack (RFAT) tracking receiver 130. More particularly, an uplink beacon signal received by tracking feed element 101(1) may be processed through PSM coupler 110(1) and an uplink beacon signal received by tracking feed element 101(2) may be processed through PSM coupler 110(2).

As illustrated in FIG. 1, at least two antenna reflectors 160 are contemplated, each having a respective, dedicated tracking feed element 101(i) and a PSM coupler 110(i). The antenna reflectors may be large (5+ meter diameter) unfurlable reflectors. Advantageously, each PSM coupler 110(i) is disposed proximate to a respective tracking feed element 101(i). Signals from the PSM couplers may be multiplexed by input multiplexer 120 and forwarded to the tracking receiver 130. The tracking receiver 130 may be configured to detect pointing errors in azimuth and elevation created by bus attitude errors and/or reflector mispointing. Azimuth and elevation error voltages output from the autotrack receiver 130 may be used by an antenna positioning mechanism (APM) controller 140, in a closed loop manner. For example, the APM controller 140 may cause one or more stepper motors or other actuators in an APM 150(i) to mechanically adjust pointing of the respective antenna reflector 160(i) so as to reduce the pointing error voltages output from the tracking receiver toward zero. More particularly, the APM controller 140 may cause one or more stepper motors or other actuators in APM 150(1) to mechanically adjust pointing of the antenna reflector 160(1) so as to reduce the pointing error voltages output from the tracking receiver and associated with PSM coupler 110(1) toward zero. Similarly, the APM controller 140 may cause one or more stepper motors or other actuators in APM 150(2) to mechanically adjust pointing of the antenna reflector 160(2) so as to reduce the pointing error voltages output from the tracking receiver and associated with PSM coupler 110(2) toward zero.

Figure 2:
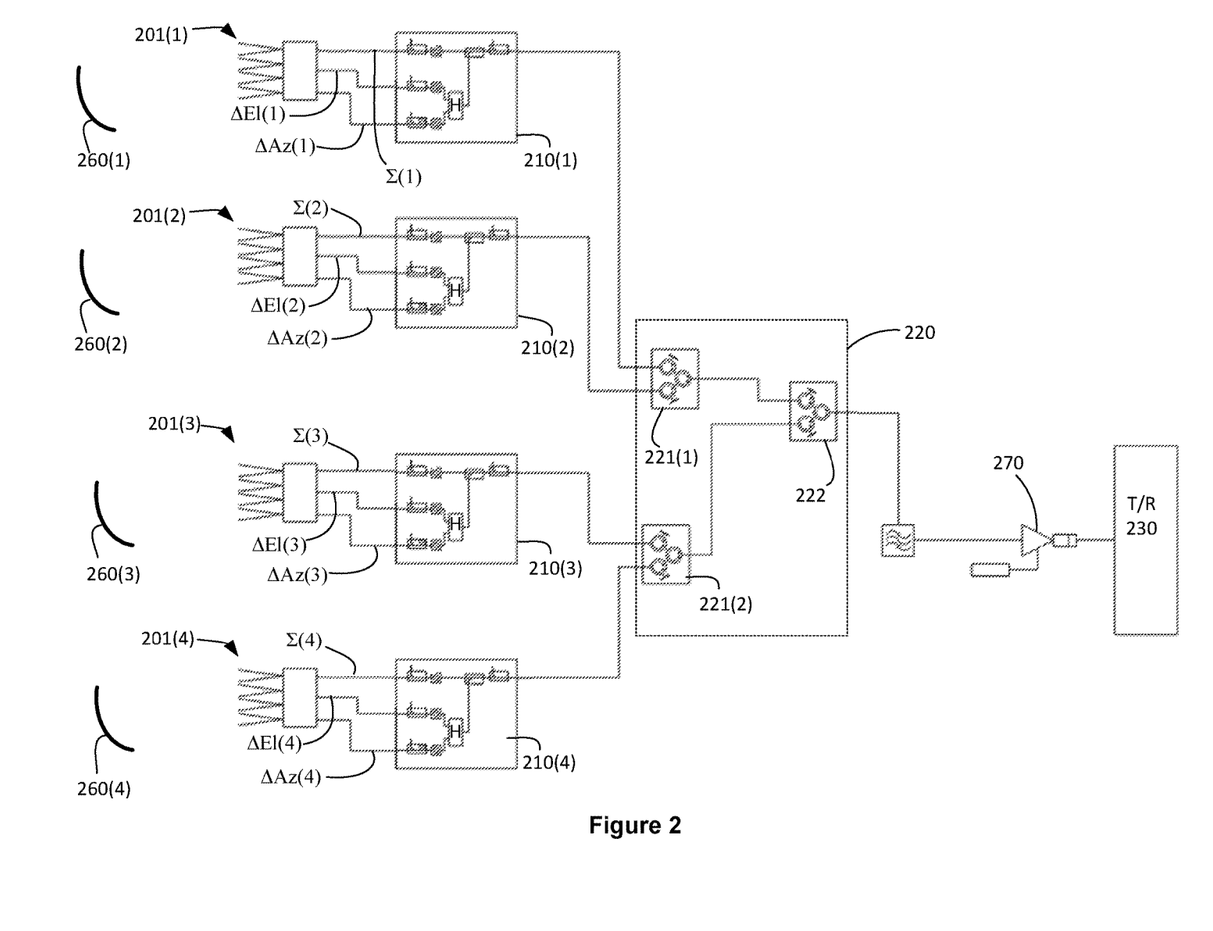
FIG. 2 illustrates a block diagram of portions of an RF auto-tracked system, in accordance with an implementation.

FIG. 2 illustrates a block diagram of an RFAT system 200 in accordance with an implementation. In the illustrated implementation the RFAT system 200 includes four antenna reflectors, antenna reflector 260(1), antenna reflector 260(2), antenna reflector 260(3), and antenna reflector 260(4) illuminated by respective tracking feeds 201(1), 201(2), 201(3) and 201(4). The tracking feeds 201 may be included in or co-located with a beam forming network and/or a plurality of radiating feed elements (not illustrated).

The tracking feeds 201(i) may each receive, by way of a respective antenna reflector 260(i), an uplink beacon signal from a ground station (not illustrated). The received uplink beacon signal may be processed through a respective PSM coupler 210(i) and forwarded to an RF autotrack (RFAT) tracking receiver 230. More particularly, an uplink beacon signal received by tracking feed element 201(1) may be processed through PSM coupler 210(1), an uplink beacon signal received by tracking feed element 201(2) may be processed through PSM coupler 210(2), an uplink beacon signal received by tracking feed element 201(3) may be processed through PSM coupler 210(3) and an uplink beacon signal received by tracking feed element 201(4) may be processed through PSM coupler 210(4).

In the example implementation illustrated in FIG. 2, four antenna reflectors 260(i) are depicted, each having a respective, dedicated tracking feed element 201(i) and PSM coupler 210(i). Some or all of the antenna reflectors 260(i) may be large (5+ meter diameter) unfurlable reflectors. Advantageously, each PSM coupler 210(i) is closely coupled with a respective tracking feed element 201(i). For example, in the illustrated implementation, no switches or other active components are disposed between a PSM coupler 210(i) and a respective feed element 201(i). More particularly, PSM coupler 210(1) is closely coupled with tracking feed element 201(1) and no active components are disposed between PSM coupler 210(1) and tracking feed element 201(1). Similarly, PSM coupler 210(2) is closely coupled with tracking feed element 201(2) and no active components are disposed between PSM coupler 210(2 and tracking feed element 201(2); PSM coupler 210(3) is closely coupled with tracking feed element 201(3) and no active components are disposed between PSM coupler 210(3) and tracking feed element 201(3); and PSM coupler 210(4) is closely coupled with tracking feed element 201(4) and no active components are disposed between PSM coupler 210(4) and tracking feed element 201(4).

Advantageously, each PSM coupler 210(i) may be disposed at a location proximal to its respective feed element 201(i). For example, in some implementations a waveguide run between a PSM coupler and its respective feed element may be less than about ten feet in length. In some implementations a PSM coupler and its respective feed element may be separated by a distance of less than two feet, for example. As a result, phase error uncertainty may be substantially reduced, because differences in electrical path length and temperature variation between signal paths $\Delta Az(i)$, $\Delta El(i)$ and $\Sigma(i)$ are minimized. More particularly, PSM coupler 210(1) may be disposed at a location proximal to tracking feed element 201(1), thereby minimizing electrical path length of signal paths $\Delta Az(1)$, $\Delta El(1)$, and $\Sigma(1)$. Similarly, PSM coupler 210(2) may be disposed at a location proximal to tracking feed element 201(2), thereby minimizing electrical path length of signal paths $\Delta Az(2)$, $\Delta El(2)$, and $\Sigma(2)$; PSM coupler 210(3) may be disposed at a location proximal to tracking feed element 201(3), thereby minimizing electrical path length of signal paths $\Delta Az(3)$, $\Delta El(3)$, and $\Sigma(3)$; and PSM coupler 210(4) may be disposed at a location proximal to tracking feed element 201(4), thereby minimizing electrical path length of signal paths $\Delta Az(4)$, $\Delta El(4)$, and $\Sigma(4)$.

In addition, waveguides providing each set of signal paths $\Sigma(i)$, $\Delta Az(i)$ and $\Delta El(i)$ may be thermally coupled together to further reduce path-to-path temperature variations, and path-to-path variations in waveguide length and cross sectional dimensions that would otherwise result from thermal expansion/contraction are minimized.

Signals from the PSM couplers 210(i) may be multiplexed in the time domain by input multiplexer 220 and forwarded to the tracking receiver 230. In the illustrated implementation, the input multiplexer 220 includes switches 221(1), 221(2) and 222 that may be configured to pass signals from a selected one of PSM couplers 210(1), 210(2), 210(3), and 210(4) to tracking receiver 230 by way of low noise amplifier 270. The tracking receiver (T/R) 230 may be configured to detect pointing errors in azimuth and elevation created by bus attitude errors and/or reflector mispointing and output error voltages to an APM controller (not illustrated) to reduce pointing errors. As described above in connection with FIG. 1, the APM controller may cause one or more stepper motors or other actuators in an APM (not illustrated) to mechanically adjust pointing of the antenna reflectors 260 so as to reduce the pointing error voltages output from the tracking receiver toward zero.

Figure 3:
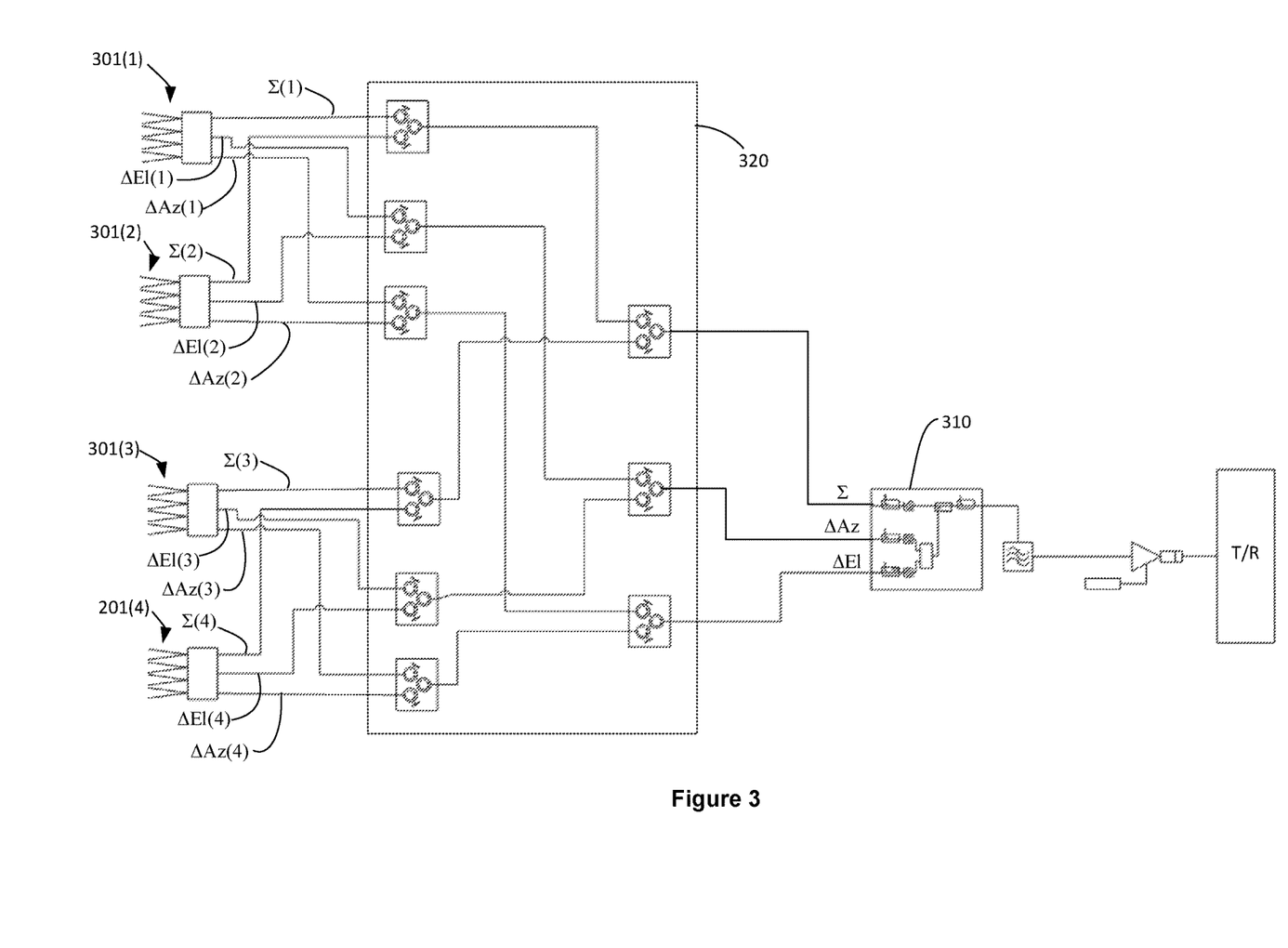
FIG. 3 illustrates a block diagram of portions of an RF auto-tracked system for comparison with the disclosed techniques.

A better understanding of the presently disclosed techniques may be obtained by comparing the implementations described above with a conventional approach illustrated in FIG. 3 in which it may be observed that a multiplexer 320 is disposed between a PSM coupler 310 and a plurality of feed element 301. In contrast to the arrangement illustrated in FIG. 3, the present inventors have appreciated that antenna pointing errors resulting from phase error uncertainty may be reduced by locating respective PSM couplers between each tracking feed and an input multiplexer. Advantageously the PSM couplers may be disposed close to respective tracking feeds. As a result, antenna pointing error attributable to phase error uncertainty is reduced. In an implementation, for example, about a 6 mdeg reduction in pointing error has been achieved.

Figure 4:
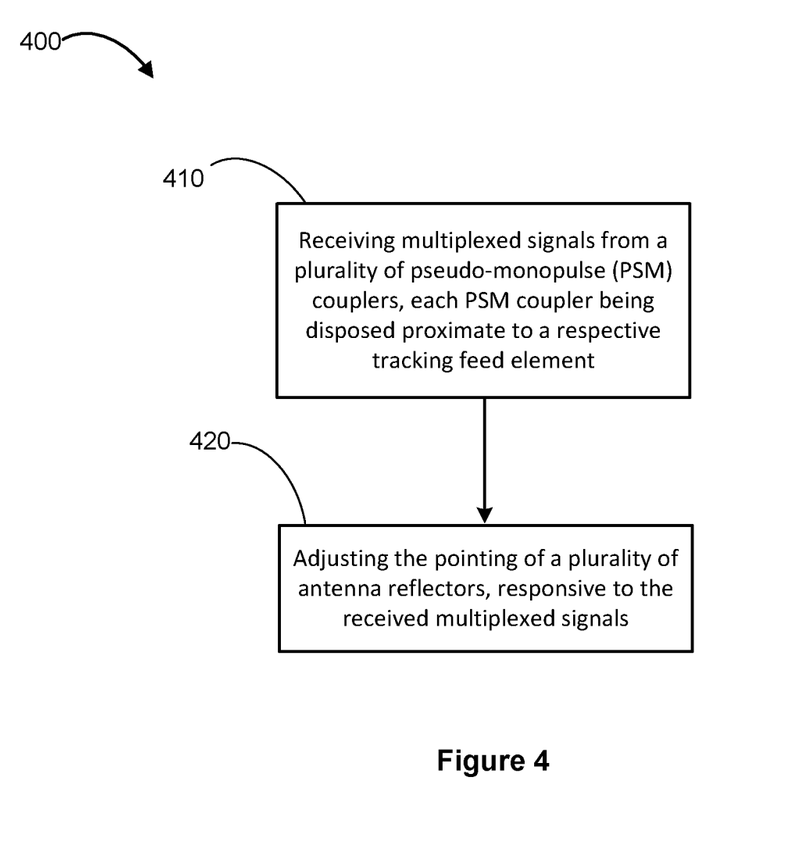
FIG. 4 illustrates a process flow diagram for adjusting the pointing of an antenna reflector that is part of a spacecraft payload subsystem, according to an implementation.

FIG. 4 illustrates a process flow diagram for adjusting the pointing of an antenna reflector that is part of a spacecraft payload subsystem, according to an implementation. As described hereinabove, the spacecraft payload subsystem may include an APM controller, an input multiplexer, a tracking receiver, a number of antenna reflectors and a number of PSM couplers, each PSM coupler being disposed proximate to a respective tracking feed element that illuminates a respective one of the plurality of reflectors, each antenna reflector being mechanically coupled with a respective APM. The method 400 may start, at block 410, with receiving, with the tracking receiver, by way of the input multiplexer, multiplexed signals from the PSM couplers. At block 420, pointing of the plurality of antenna reflectors may be adjusted, responsive to the received multiplexed signals. Each respective tracking feed element may be configured to receive a respective uplink beacon signal from the ground by way of one of the antenna reflectors and may be coupled by way of a respective one of the PSM couplers and the input multiplexer to the tracking receiver. The tracking receiver may be configured to output pointing error information to the APM controller corresponding to the received multiplexed signals. In some implementations, adjusting the pointing of the antenna reflectors may include the APM controller sending commands to one or more APMs.

In some implementations, pointing errors are further reduced by using, during payload operation, only electric thrusters for propulsive maneuvers. Spacecraft thrusters may be broadly categorized as either "chemical" or "electric" based on the respective primary energy source. Chemical thrusters, for example bipropellant thrusters, deliver thrust by converting chemical energy stored in the propellant to kinetic energy delivered to combustion products of the chemical propellant, e.g., a fuel such as monomethyl hydrazine and an oxidizer such as dinitrogen tetroxide. Chemical thrusters suitable for spacecraft propulsion systems may deliver relatively high thrust of 10-1000 newtons, for example.

An electric thruster, as contemplated by the present disclosure, may be or include, for example, a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle. In some implementations, the electric thruster may be Hall Effect thrusters (HET) such as a stationary plasma thruster (SPT). Advantageously, HET's are operable at thrust levels as low as 50 mN, and therefore induce much lower transient pointing disturbances when fired. Using electric thrusters during payload operation exclusively, instead of chemical thrusters has been found to substantially reduce thruster induced transient pointing errors.

In some implementations, a step size of the APM may be reduced with respect to conventional designs. For example, the APM may have a step size less than 0.0015°, thereby providing an even further reduction in pointing error, whether or not thrusters are in use.

Thus, techniques for improving spacecraft antenna point accuracy have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising a payload subsystem, the payload subsystem including:
    a tracking receiver; an input multiplexer;
    an antenna pointing mechanism (APM) controller; and
    a plurality of antenna reflectors, each antenna reflector mechanically coupled with a respective APM, and illuminated by a respective tracking feed element, each respective tracking feed element being configured to receive an uplink beacon signal from the ground by way of one of the antenna reflectors and being coupled, by way of a respective pseudo-monopulse (PSM) coupler and the input multiplexer, to the tracking receiver; wherein:
    the tracking receiver is configured to receive multiplexed signals from the PSM couplers by way of the input multiplexer and output corresponding pointing error information to the APM controller;
    the APM controller is configured to send commands to one or more of the APMs; and
    each APM is configured to point a respective antenna reflector in response to the commands, wherein each PSM coupler is disposed proximate to a respective tracking feed element, wherein each PSM coupler is communicatively coupled with a respective tracking feed element by a waveguide having a run length less than ten feet.

2. The spacecraft of claim 1, wherein each respective tracking feed element is configured to receive a different respective uplink beacon signal.

3. The spacecraft of claim 1, wherein the input multiplexer is disposed between tracking receiver and the PSM couplers.

4. The spacecraft of claim 1, wherein each PSM coupler is coupled with a respective tracking feed element by separate signal paths for each of $\Delta Az(i)$, $\Delta El(i)$ and $\Sigma$.

5. The spacecraft of claim 4, wherein each separate signal path includes a respective waveguide, the respective waveguides being thermally coupled together to reduce temperature differences between respective waveguides.

6. The spacecraft of claim 1, wherein at least one antenna reflector is an unfurlable reflector having a diameter, when unfurled, of at least five meters.

7. The spacecraft of claim 1, further comprising electric thrusters, the spacecraft being configured to avoid propulsive maneuver during operation of the payload subsystem except with the electric thrusters.

8. The spacecraft of claim 1, wherein the APM has a step size less than 1.5 mdeg.

9. An Radio Frequency (RF) autotracking (RFAT) subsystem for a spacecraft, the RFAT subsystem comprising:
    a tracking receiver; an input multiplexer;
    an antenna pointing mechanism (APM) controller; and
    a plurality of antenna reflectors, each antenna reflector mechanically coupled with a respective APM, and illuminated by a respective tracking feed element, each respective tracking feed element being configured to receive an uplink beacon signal from the ground by way of one of the antenna reflectors and being coupled, by way of a respective pseudo-monopulse (PSM) coupler and the input multiplexer, to the tracking receiver;
    the tracking receiver is configured to receive multiplexed signals from the PSM couplers by way of the input multiplexer and output corresponding pointing error information to the APM controller;
    the APM controller is configured to send commands to one or more of the APMs; and
    each APM is configured to point a respective antenna reflector in response to the commands, wherein each PSM coupler is disposed proximate to a respective tracking feed element, wherein each PSM coupler is communicatively coupled with a respective tracking feed element by a waveguide having a run length less than ten feet.

10. The spacecraft of claim 9, wherein the input multiplexer is disposed between tracking receiver and the PSM couplers.

11. The spacecraft of claim 9, wherein each PSM coupler is coupled with a respective tracking feed element by separate signal paths for each of $\Delta Az(i)$, $\Delta El(i)$ and $\Sigma$.

12. The spacecraft of claim 11, wherein each separate signal path includes a respective waveguide, the respective waveguides being thermally coupled together to reduce temperature differences between respective waveguides.

13. A method comprising:
    receiving, with a tracking receiver of a spacecraft payload subsystem, by way of an input multiplexer, multiplexed signals from a plurality of pseudo-monopulse (PSM) couplers, each PSM coupler being disposed proximate to a respective tracking feed element; and
    adjusting the pointing of a plurality of antenna reflectors, responsive to the received multiplexed signals; wherein:
    the spacecraft payload subsystem includes
    the tracking receiver
    an input multiplexer;
    an antenna pointing mechanism (APM) controller; and
    the plurality of antenna reflectors, each antenna reflector mechanically coupled with a respective APM, and illuminated by a respective tracking feed element, each respective tracking feed element being configured to receive a respective uplink beacon signal from the ground by way of one of the antenna reflectors and being coupled by way of a respective one of the plurality of PSM couplers and the input multiplexer to the tracking receiver;

the tracking receiver is configured to receive the multiplexed signals from the PSM couplers by way of the input multiplexer and output corresponding pointing error information to the APM controller;

the APM controller is configured to send commands to one or more of the APMs; and each APM is configured to point a respective antenna reflector in response to the commands, wherein each PSM coupler is disposed proximate to a respective tracking feed element, wherein each PSM coupler is communicatively coupled with a respective tracking feed element by a waveguide having a run length less than ten feet.

14. The method of claim 13, wherein the input multiplexer is disposed between tracking receiver and the PSM couplers.

15. The method of claim 13, wherein each PSM coupler is coupled with a respective tracking feed element by separate signal paths for each of $\Delta Az(i)$, $\Delta El(i)$ and $\Sigma$.

16. The method of claim 15, wherein each separate signal path includes a respective waveguide, the respective waveguides being thermally coupled together to reduce temperature differences between respective waveguides.

* * * * *